United States Patent
Kobayashi et al.

(10) Patent No.: US 6,676,865 B2
(45) Date of Patent: Jan. 13, 2004

(54) EXTRUSION MOLDING PROVIDED WITH INSERT AND METHOD OF PRODUCING THE SAME

(75) Inventors: Masao Kobayashi, Ichinomiya (JP); Kazuo Takeda, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 64 days.

(21) Appl. No.: 10/154,969

(22) Filed: May 28, 2002

(65) Prior Publication Data

US 2002/0192451 A1 Dec. 19, 2002

Related U.S. Application Data

(62) Division of application No. 09/607,945, filed on Jun. 30, 2000, now abandoned.

(30) Foreign Application Priority Data

Jul. 1, 1999 (JP) ........................................ P. 11-187363

(51) Int. Cl.[7] .............................................. B29C 47/06
(52) U.S. Cl. ..................... 264/45.9; 264/46.4; 264/46.5; 264/171.13; 264/171.17
(58) Field of Search ..................... 428/304.4; 264/45.9, 264/46.4, 46.5, 46.6, 46.7, 167, 171.13, 171.14, 171.16, 171.17

(56) References Cited

U.S. PATENT DOCUMENTS

| | | | |
|---|---|---|---|
| 4,455,338 A | 6/1984 | Henne | |
| 5,474,722 A | * 12/1995 | Woodhams | ............... 264/45.3 |
| 5,474,841 A | 12/1995 | Matsuki et al. | |
| 5,651,217 A | 7/1997 | Mesnel | |
| 5,945,048 A | * 8/1999 | Ensinger | ................... 264/46.1 |
| 6,024,906 A | * 2/2000 | Cook | ...................... 264/177.2 |
| 6,162,380 A | * 12/2000 | Kohn et al. | ................. 264/45.9 |
| 6,189,198 B1 | * 2/2001 | Keeney et al. | ............. 29/527.4 |
| 6,214,267 B1 | * 4/2001 | Keys | ..................... 264/171.16 |
| 6,312,630 B1 | * 11/2001 | Hartman | .................... 264/45.9 |
| 6,360,489 B1 | * 3/2002 | Burge et al. | ............... 49/496.1 |
| 6,514,604 B2 | * 2/2003 | Gopalan et al. | ......... 428/319.3 |
| 6,604,715 B2 | * 8/2003 | Howe | .......................... 248/62 |
| 2001/0031351 A1 | * 10/2001 | Rood | ...................... 428/318.6 |

* cited by examiner

*Primary Examiner*—Mark Eashoo
(74) *Attorney, Agent, or Firm*—Posz & Bethards, PLC

(57) ABSTRACT

Extrusion molding is performed while the extrusion molding is regulated from the skin layer side so that the foaming capacity of a portion opposite to a surface of a reinforcement portion of an insert having at least one gap portion is smaller than the foaming capacity of a portion where the gap portion is filled with the foam layer when a foamable resin is foamed.

2 Claims, 3 Drawing Sheets

EXTRUSION MOLDING PROVIDED WITH INSERT AND METHOD OF PRODUCING THE SAME

This is a divisional application of U.S. application Ser. No. 09/607,945 filed Jun. 30, 2000 and now abandoned incorporates said application in its entirety by reference.

BACKGROUND OF THE INVENTION

1. Field of the Invention

The present invention relates to an extrusion molding adapted to an opening trim, or the like, of a car provided with a hard insert in which reinforcement portions and space portions. are formed alternately longitudinally, and relates to a method of producing such an extrusion molding.

The present application is based on Japanese Patent Application No. Hei. 11-187363, which is incorporated herein by reference.

2. Description of the Related Art

As shown in FIG. 5, an opening trim of a car is constituted by an elongated base 100 approximately U-shaped in section, and any insert 1 buried in the base 100. The base 100 is made of a soft resin such as soft polyvinyl chloride (PVC), thermoplastic olefin (TPO), or the like. The base 100 includes a pair of lip portions 101 which are formed opposite to each other so as to be protruded from opposite inner surfaces, respectively, of the base 100. On the other hand, as shown in FIG. 2, the insert 1 includes a plurality of U-shaped reinforcement portions 10, and bridge portions 11 connecting the plurality of reinforcement portions 10 to one another successively at intervals of a predetermined distance, by which gap portions 12 are formed between respective adjacent ones of the reinforcement portions 10. Further, the U-shape of the base 100 is held by the reinforcement portions 10 and the base 100 is made deformable in bending by the presence of the bridge portions 11 and the gap portions 12.

Accordingly, the opening trim thus formed is incorporated into a vehicle so that an attachment portion of the vehicle is sandwiched between the pair of lip portions 101. As a result, the attachment portion is clamped by the pair of lip portions 101, so that the securing strength is secured in a region of the presence of each reinforcement portion 10. On the other hand, the opening trim can be deformed in bending along the shape of the attachment portion in a region of the presence of each gap portion 12 so that the opening trim is assembled into the vehicle securely.

The opening trim is produced by an extrusion molding method in which the insert 1 and a molten resin for forming the base 100 are extruded simultaneously while supplying the insert and supplying the molten resin to the circumference of the insert.

In the background-art opening trim, however, there was a disadvantage that a surface of the base 100 was uneven between the region where the reinforcement portions 10 were present and the region where the gap portions 12 were present, so that the background-art opening trim looked unattractive and felt unpleasant to the touch.

SUMMARY OF THE INVENTION

The present invention has been attained upon such circumstances and an object thereof is to smooth a surface shape of an extrusion molding which is reinforced with a hard insert having reinforcement portions and gap portions, thereby improving quality in external appearance of the extrusion molding.

In order to solve the above problem, according to an aspect of the present invention, there is provided an insert-containing extrusion molding comprising: a hard insert disposed so as to have a gap portion in at least a portion and so as to be deformable in bending in the gap portion; a foam layer in which the insert is buried and with which the gap portion is filled; and a skin layer with which a surface of the foam layer is coated; wherein the foam layer has an expansion ratio in a portion where the foam layer abuts on a surface of the insert is smaller than an expansion ratio in a portion where the gap portion is filled with the foam layer.

According to another aspect of the present invention, there is provided a method of producing an insert-containing extrusion molding by extruding a hard insert so as to have a gap portion in at least a portion, a foamable resin and a skin resin at once to thereby produce an extrusion molding having the insert, a foam layer in which the insert is buried, and a skin layer with which a surface of the foam layer is coated, wherein a surface of the skin layer is smoothed by performing extrusion molding while controlling the extrusion molding from the the skin layer side so that the foam volume in a portion opposite to a surface of the insert is smaller than the foam volume in a portion where the gap portion is filled when the foamable resin is foamed.

Features and advantages of the invention will be evident from the following detailed description of the preferred embodiments described in conjunction with the attached drawings.

DETAILED DESCRIPTION OF THE PREFERRED EMBODIMENTS

Figure 1:
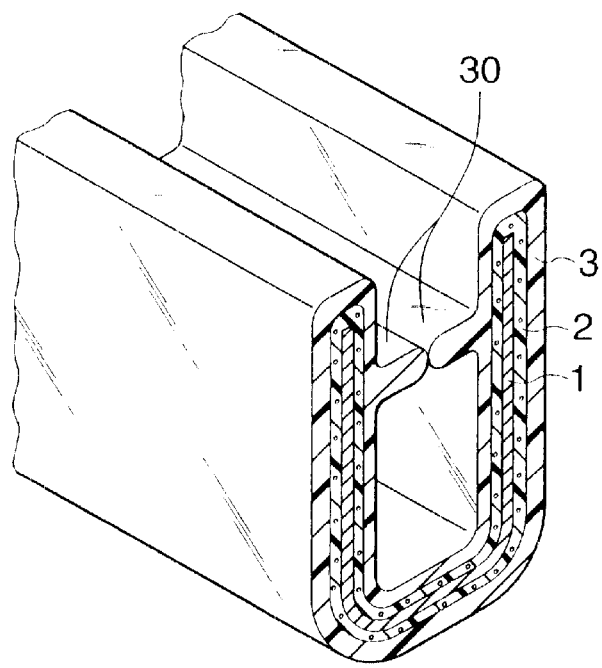
FIG. 1 shows a perspective view, partly in section, showing an extrusion molding according to an embodiment of the present invention.

In the case of extrusion molding, the supply rate per unit time, of a molding material is constant if the extrusion rate is constant. In the background-art opening trim, however, the molding material was thickened in the position of the gap portions 12 due to the absence of the reinforcement portions 10, because the sectional area of the base was unchanged between the position of the reinforcement portions 10 and the position of the gap portions 12. Hence, after molding, the quantity of volume shrinkage of the molding material in the position of the gap portions 12 was larger than that in the position of the reinforcement portions 10. Even in the case where the surface was smooth just after extrusion molding, the surface was depressed in the position of the gap portions 12 while swollen in the position of the reinforcement portions 10 after cooling. Thus, there was a disadvantage that the background-art opening trim looked unattractive and felt unpleasant to the touch.

In the method of producing an extrusion molding according to the present invention, therefore, extrusion molding is performed while being regulated from the skin layer side so that the foaming capacity of a portion opposite to the surface of the insert is smaller than the foaming capacity of a portion where the gap portions are filled when the foamable resin is foamed. As a result, the expansion ratio of the foamable resin is low in the portion opposite to the surface of the insert and high in the portion where the gap portions are filled. Accordingly, the difference in quantity of volume shrinkage due to cooling after molding and the difference in quantity of volume expansion due to foaming cancel out each other, so that the surface of the skin layer can be smoothed.

Further, in the extrusion molding according to the present invention, the foam layer is formed so that it has the expansion ratio which is larger in a portion abutting on the surface of the insert while smaller in a portion where the gap portions are filled. Accordingly, the difference in quantity of volume shrinkage due to cooling after molding and the difference in quantity of volume expansion due to foaming cancel out each other. Thus, the surface of the skin layer is smoothed compared with the background art. Hence, the quality of external appearance is improved, so that the extrusion molding looks nicer and feels more pleasant to the touch.

The insert is of a hard type made of a resin, a metal, or the like, and is formed so as to have a gap portion in at least a portion. The presence of the gap portion allows the extrusion molding to be deformable in bending. The gap portion may be provided as a plurality of gap portions formed between a plurality of inserts or formed in an insert itself such as a net-like insert or a ladder-like insert.

The foam layer can be made from foamable TPO, foamable PVC, or the like. The foam layer is formed so that the expansion ratio in a portion where the foam layer abuts on the surface of the insert is smaller than the expansion ratio in a portion where the gap portion is filled with the foam layer. In extrusion molding, the expansion ratio of the foam layer between the surface of the insert and the gap portion can be easily adjusted to be in a predetermined range if the distance between the surface of the insert and a molding surface of an extrusion mold is set to be a predetermined value, because the surface shape of the extrusion molding can be controlled by the extrusion mold.

The skin layer may be made of soft PVC, TPO, or the like. Quality of external appearance of the skin layer can be improved more greatly by applying embossing or fuzz-planting to the surface of the skin layer. Since the surface unevenness is reduced by the foam layer, the thickness of the skin layer can be made approximately uniform as a whole so as to be formed easily by extrusion molding.

To produce the extrusion molding according to the present invention, a foam layer is formed by foaming a foamable resin in an extrusion mold after extruding the foamable resin and a skin layer resin in order onto a surface of the insert while supplying the insert into the extrusion mold. Further, the present invention is configured so that the foaming capacity in a space between a mold surface of the extrusion mold and the insert is smaller than the foaming capacity in the gap portion. Accordingly, because the expansion ratio in a portion where the foam layer abuts on the surface of the insert is smaller than the expansion ratio in a portion where the gap portion is filled with the foam layer, so that the portion where the foam layer abuts on the surface of the insert swells less while the portion where the gap portion is filled with the foam layer swells more.

When the extrusion molding is taken out of the extrusion mold and cooled, both the foam layer and the skin layer shrink. Since the quantity of shrinkage varies in accordance with the difference in volume of the molding material, the quantity of shrinkage in the portion where the foam layer abuts on the surface of the insert is small while the quantity of shrinkage is large in the portion where the gap portion is filled with the foam layer. Hence, the quantity of volume expansion due to foaming and the quantity of volume shrinkage due to cooling cancel out each other. As a result, the surface of the foam layer is provided as an even surface little in unevenness. Further, because the quantity of volume shrinkage is approximately constant in any portion of the skin layer, the surface of the resulting extrusion molding can be provided as an even surface little in unevenness.

In the resulting extrusion molding, the expansion ratio of the foamable resin in a region of the presence of the insert is preferably in a range of from 1.05 to 5.0 and the expansion ratio of the foamable resin in the gap portion is preferably in a range of from 1.2 to 6.0. If either of the two expansion ratios is smaller than its lower limit, unevenness of the surface of the resulting foam molding becomes conspicuous. If either of the two expansion ratios is larger than its upper limit, unevenness of the surface of the resulting foam molding becomes also conspicuous. Preferably, the expansion ratio a of the foamable resin in the gap portion has the relation a>b with the expansion ratio b of the foamable resin in the region of the presence of the insert. More preferably, the two expansion ratios satisfy the relation given by the following expression. By satisfying the following expression, the surface of the resulting foam molding can be smoothed more greatly.

$$a \geq b + 0.15$$

Incidentally, the shape of the extrusion molding according to the present invention may be provided as a structure in which the whole surface of the insert is coated with both the foam layer and the skin layer or as a structure in which the insert has a surface exposed on one surface of the structure and the other surface on which the foam layer and the skin layer are laminated. Further, the same method as in the background art can be used as an extrusion molding method without any particular limitation except that foaming of the foam layer is mainly performed in the extrusion mold.

The present invention will be described below specifically on the basis of an embodiment thereof, a background-art example and test examples.

Embodiment

FIG. 1 is an enlarged view showing important part of an opening trim produced according to an embodiment of the present invention. The opening trim has an insert 1; a foam layer 2 in which the insert 1 is buried; and a skin layer 3 with which the whole surface of the foam layer 2 is coated. The opening trim has an approximately U-shape as a predetermined shape in section. Further, a pair of lip portions 30 protruded from opposite inner surfaces of the skin layer 3 respectively so as to be in opposition to each other are formed so as to extend longitudinally.

Figure 2:
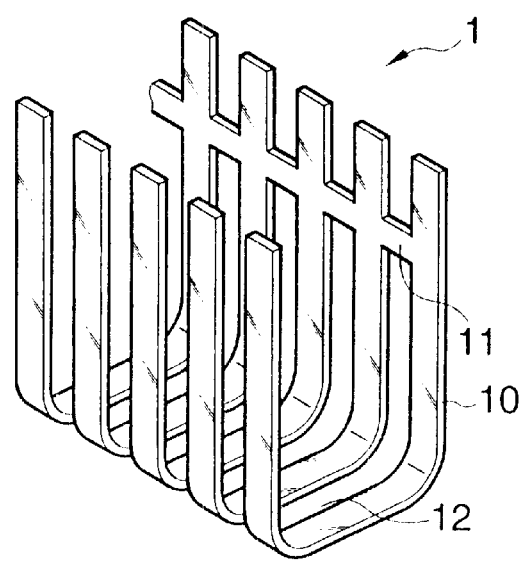
FIG. 2 shows a perspective view showing important part of an insert used in the extrusion molding according to an embodiment of the present invention.

The insert 1 is made of a metal plate. As shown in FIG. 2, a plurality of reinforcement portions 10 approximately U-shaped are arranged longitudinally at intervals of distance. Adjacent ones of the reinforcement portions 10 are connected to each other by bridge portions 11 respectively.

As a result, gap portions 12 are formed between respective adjacent ones of the reinforcement portions 10. Further, the bridge portions 11 are deformable, and the insert 1 is deformable in bending by the presence of the gap portions 12.

Figure 3:
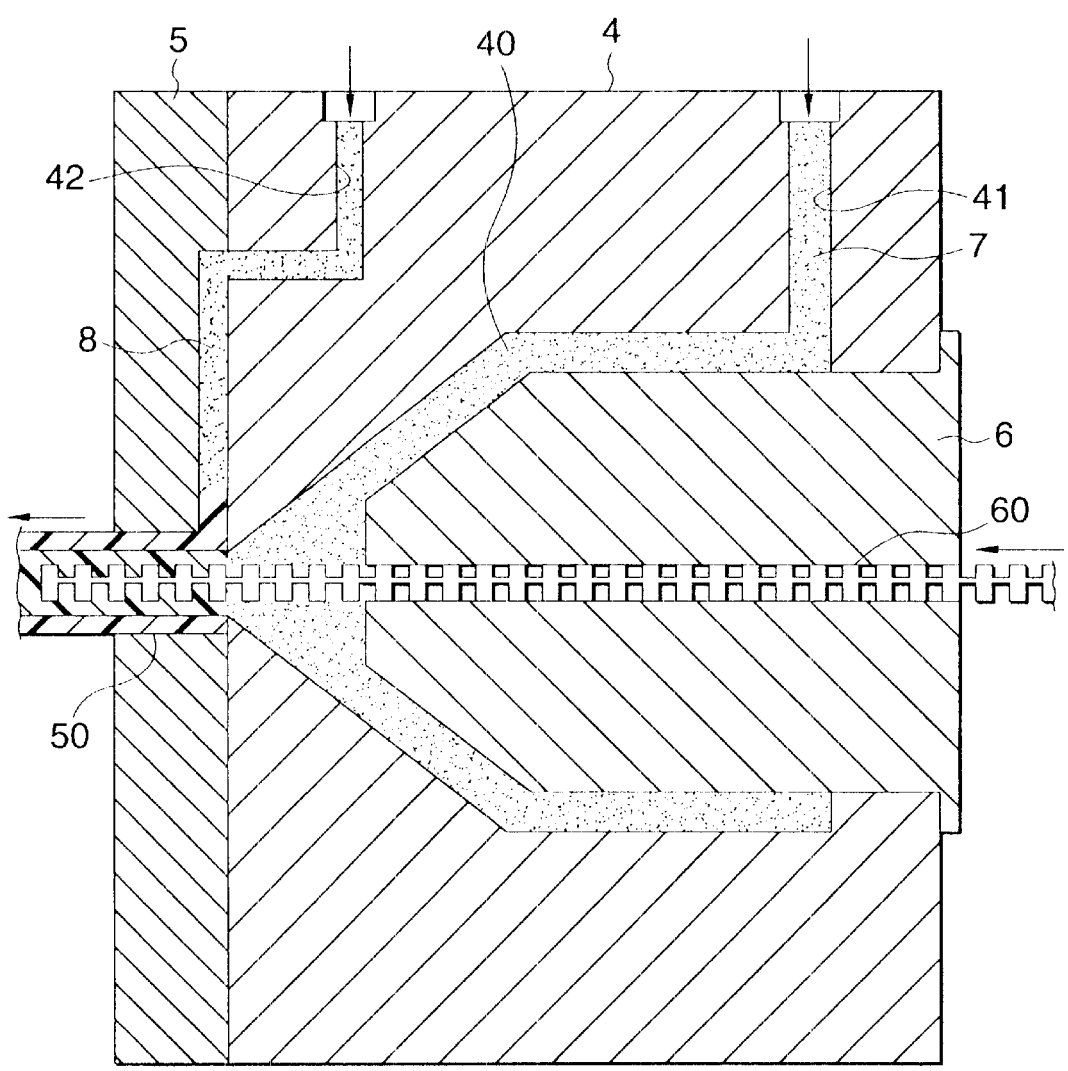
FIG. 3 shows a sectional view showing important part of an extrusion molding apparatus used in a method of producing an extrusion molding according to an embodiment of the present invention.

FIG. 3 is a sectional view showing a front end portion of an extrusion molding apparatus used in this embodiment. A method of producing an extrusion molding by using the extrusion molding apparatus in this embodiment will be described below.

The extrusion molding apparatus is constituted by a first die 4 provided with a main hole 40, and a second die 5 fixed to a front end of the first die 4. The apparatus is configured such that a torpedo 6 can come into and go out of the main hole 40. A first feed passage 41 is provided in the first die 4 so as to be opened at a rear end of the main hole 40 for the purpose of feeding foamable TPO 7. Further, a second feed passage 42 is provided in the front of the first passage 41 so as to be opened both at a front end of the first die 4 and at a rear end of the second die 5 for the purpose of feeding TPO 8. Further, a third feed passage 60 is formed in the center of the torpedo 6 so as to be opened at a front end of the torpedo 6 for the purpose of feeding the insert 1.

Further, this producing method performs extrusion molding while feeding the insert 1 into the main hole 40 through the third feed passage 60, feeding the foamable TPO 7 onto the surface of the insert 1 through the first feed passage 41 and feeding the TPO 8 onto the surface of the foamable TPO 7 through the second feed passage 42. The laminate of three layers thus laminated is extruded from a sectionally approximately U-shaped opening 50 of the second die 5 and drawn at a predetermined rate. Configuration is made so that the foamable TPO 7 is foamed to a certain degree in the main hole 40 and further foamed approximately completely in the second die 5 but still foamed to a certain degree after the foamable TPO 7 is extruded from the second die 5.

Figure 4:
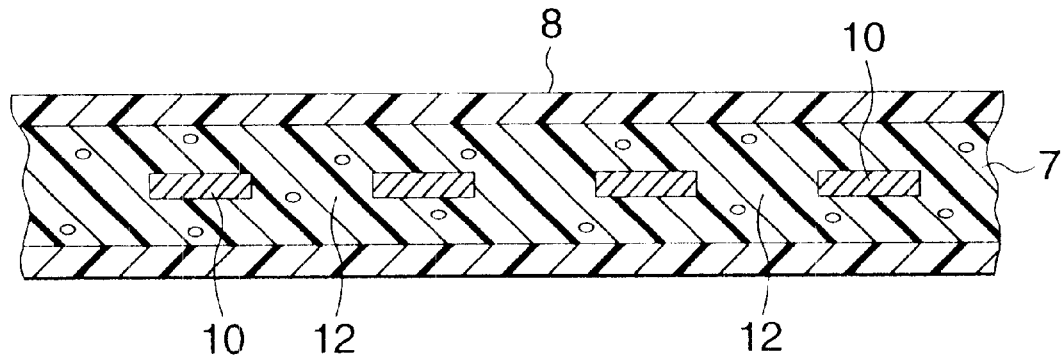
FIG. 4 shows a sectional view showing important part of an extrusion molding in the extrusion molding apparatus used in the method of producing an extrusion molding according to an embodiment of the present invention.
Figure 5:
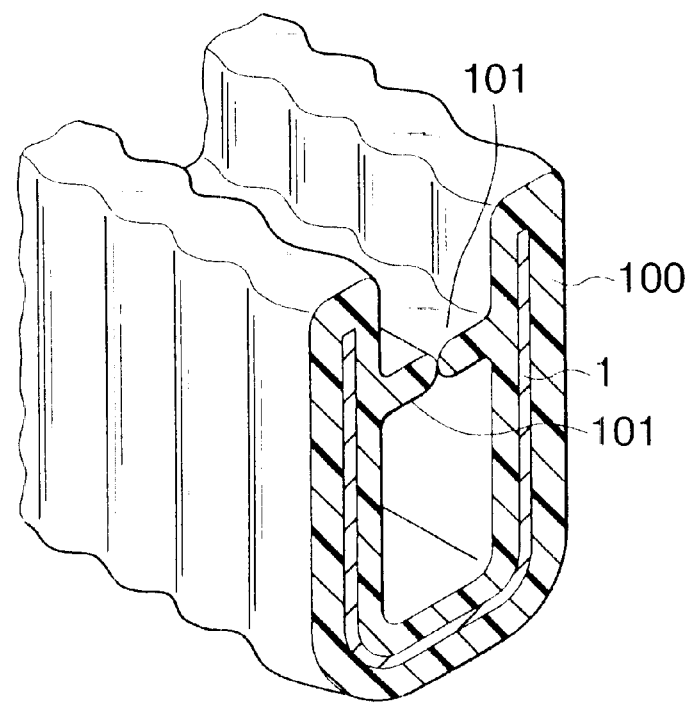
FIG. 5 show s a perspective view, partly in section, showing a background-art extrusion molding.

As shown in FIG. 4, foaming in a direction of the thickness of the foamable TPO 7 in the second die 5 is controlled by one mold surface of the second die 5 and the insert 1 in the position of each reinforcement portion 10 of the insert 1 and controlled by opposite mold surfaces of the second die 5 in the position of each gap portion of the insert 1. Hence, the foaming capacity in the position of the reinforcement portions 10 is smaller than the foaming capacity in the position of the gap portions 12, so that the expansion ratio in the position of the reinforcement portion 10 is smaller than the expansion ratio in the position of the gap portion 12.

This embodiment is configured such that the insert 1 is 0.4 mm thick, that the foam layer 2 is 2.0 mm thick, that the expansion ratio in the position of the reinforcement portion 10 is 1.5, and that the expansion ratio in the position of the gap portion 12 is 3.0. Incidentally, the skin layer 3 is 1.0 mm thick and 65 HS hardness of JIS K 6301-A.

CONVENTIONAL EXAMPLE

An extrusion molding was produced in the same manner as in the foregoing embodiment except that the material fed from the first feed passage 41 was made equal to the TPO fed from the second feed passage 42, and that the foam layer 2 was formed as a solid layer.

Test and Evaluation

The surface unevenness of each opening trim thus obtained was measured. As a result, the difference in elevation between a recess and a protrusion in the embodiment was in a range of from 5 to 30 $\mu$m, that is, the surface was smoothed greatly and the opening trim had a high quality in external appearance compared with the opening trim of the background-art example in which the difference in elevation was in a range of from 50 to 150 $\mu$m. It is apparent that this exhibits the effect due to both the formation of the foam layer 2 and the difference in expansion ratio between the position of the reinforcement portion 10 and the position of the gap portion 12.

TEST EXAMPLES

Various extrusion moldings were produced in the same manner as in the foregoing embodiment except that inserts 1 with various thicknesses were used and that the expansion ratios in the position of the reinforcement portion 10 and in the position of the gap portion 12 were changed variously as shown in Table 1. The surface unevenness of each of the thus obtained extrusion moldings was measured. Results are shown in Table 1 in which the case where the difference in elevation was not larger than 30 $\mu$m was evaluated as ○, the case where the difference in elevation was in a range of from 30 to 50 $\mu$m was evaluated as Δ, and the case where the difference in elevation was not smaller than 50 $\mu$m was evaluated as X. Incidentally, in Table 1, in the case where the expansion ratio in the position of the reinforcement portion 10 was quite equal to the expansion ratio in the position of the gap portion 12, natural foaming was performed without any control after the molding was extruded from the second die 5.

It is apparent from Table 1 that the surface unevenness is large when the expansion ratio k in the position of the reinforcement portion 10 and the expansion ratio a in the position of the gap portion 12 satisfy the relation a≦b, and that the surface unevenness is particularly large when either of the expansion ratios is in a low range. It is further apparent that the range a≧b+0.15 is especially preferred.

Incidentally, the surface unevenness is small if the difference between the two expansion ratios is large. If the difference between the expansion ratio a in the position of the gap portion 12 and the expansion ratio b in the position of the reinforcement portion 10 is too large as shown by the right-hand corner of Table 1, the region of the gap portion 12 is conversely swollen and the region of the reinforcement portion 10 is depressed to make the surface unevenness conspicuous

TABLE 1

| Reinforcement Portion Expansion Ratio b | Gap portion Expansion Ratio a | | | | | | | |
|---|---|---|---|---|---|---|---|---|
| | 1.1 | 1.2 | 1.5 | 2.0 | 3.0 | 4.0 | 5.0 | 6.0 |
| 1.05 | x | ○ | ○ | — | — | — | — | — |
| 1.1 | — | x | ○ | ○ | — | — | — | — |
| 1.2 | — | x | ○ | ○ | — | — | — | — |
| 1.5 | — | — | Δ | ○ | — | — | — | — |
| 2.0 | — | — | — | Δ | ○ | — | — | — |
| 3.0 | — | — | — | — | Δ | ○ | ○ | — |
| 4.0 | — | — | — | — | — | Δ | ○ | ○ |
| 5.0 | — | — | — | — | — | — | Δ | ○ |

That is, in the method of producing an insert-containing extrusion molding according to the present invention, an extrusion molding smooth in its surface and excellent both in quantity of external appearance and in sense of touch can be produced easily and securely. Further, the insert-containing extrusion molding according to the present invention is excellent both in quality of external appearance and in sense of touch because its surface is smooth, so that both design ingenuity and feeling of quality of a car are improved if the insert-containing extrusion molding is applied to an opening trim, or the like, of the car.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method of producing an extrusion molding provided with an insert, comprising steps of:

preparing an insert having a gap portion;

extruding a foamable resin on said insert so as to form a foam layer on said insert; and extruding a skin resin on said extruded foamable resin to form a skin layer while regulating expansion of said formable resin so that a foaming capacity in a portion opposite to said insert is smaller than that in a portion where said gap portion is filled with said foamable resin.

2. A method of producing an extrusion molding according to claim 1, wherein said skin resin is extruded between said foamable resin and an inner surface of a die to thereby regulate the expansion of said formable resin.

* * * * *